(12) United States Patent
Kizhepat et al.

(10) Patent No.: US 9,609,317 B1
(45) Date of Patent: *Mar. 28, 2017

(54) VIDEO TRANSCODER STREAM MULTIPLEXING SYSTEMS AND METHODS

(71) Applicant: Vuemix, Inc., Santa Clara, CA (US)

(72) Inventors: Govind Kizhepat, Los Altos Hills, CA (US); Erik Nystrom, Santa Clara, CA (US); Yung-Hsiao Lai, Fremont, CA (US)

(73) Assignee: Vuemix, Inc., Santa Clara, CA (US)

( * ) Notice: Subject to any disclaimer, the term of this patent is extended or adjusted under 35 U.S.C. 154(b) by 942 days.

This patent is subject to a terminal disclaimer.

(21) Appl. No.: 13/692,337

(22) Filed: Dec. 3, 2012

Related U.S. Application Data

(63) Continuation of application No. 13/369,169, filed on Feb. 8, 2012, now Pat. No. 8,325,821.

(51) Int. Cl.
*H04N 7/12* (2006.01)
*H04N 19/40* (2014.01)

(52) U.S. Cl.
CPC .............................. *H04N 19/00472* (2013.01)

(58) Field of Classification Search
CPC ..... H04N 21/234345; H04N 21/23608; H04N 21/242; H04N 21/4345
See application file for complete search history.

(56) References Cited

U.S. PATENT DOCUMENTS

| 6,167,084 | A | * | 12/2000 | Wang et al. | ............. | 375/240.02 |
| 7,836,193 | B2 | | 11/2010 | Ducharme | | |
| 8,164,618 | B2 | | 4/2012 | Yang et al. | | |
| 2011/0310301 | A1 | | 12/2011 | Kim et al. | | |

* cited by examiner

*Primary Examiner* — Nhon Diep
(74) *Attorney, Agent, or Firm* — Law Office of Andrei D Popovici, PC

(57) ABSTRACT

In some embodiments, a video (e.g. MPEG-2, H.264) transcoder channel pool is used to transcode multiple independent videos (programs) per channel substantially concurrently. A syntactically-unified combined input video stream is assembled by interleaving segments of different input video streams. The combined stream may be a container stream or elementary stream. Each segment includes one or more groups of pictures (GOP). The combined stream includes the payload video data of the input streams in unmodified form, and modified header data characterizing the combined stream as a single video stream. The combined input stream is transcoded using a single transcoder channel/input port to generate a combined output video stream. Multiple independent output video streams are assembled by de-interleaving segments of the combined output video stream according to stored interleaving break identifiers. Assembling the output video streams includes updating output video stream header fields according to stored header field data.

25 Claims, 8 Drawing Sheets

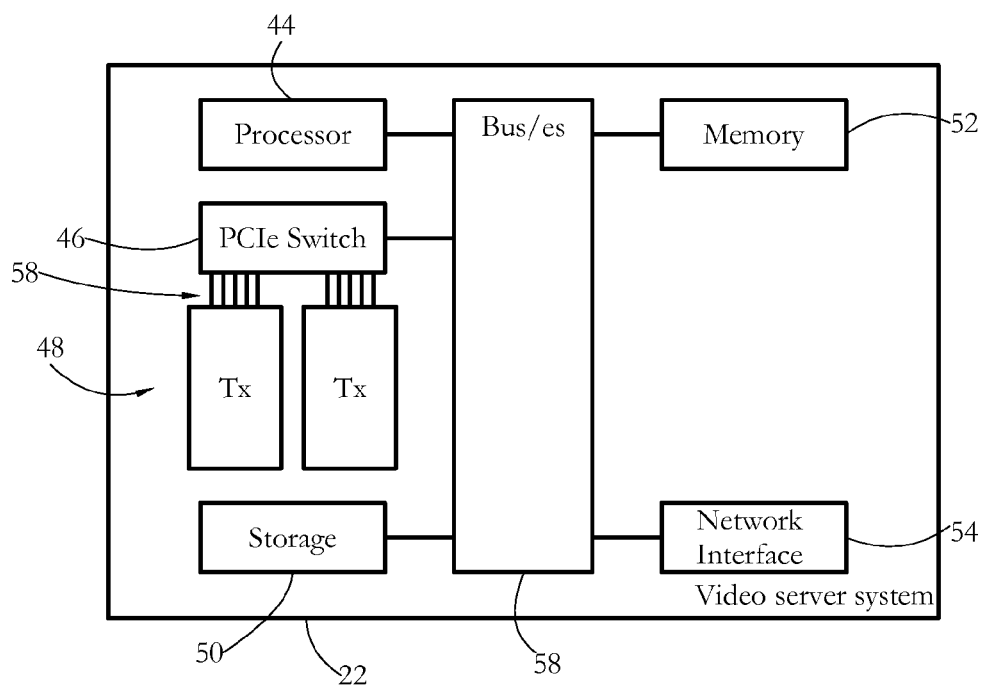
FIG. 2-A
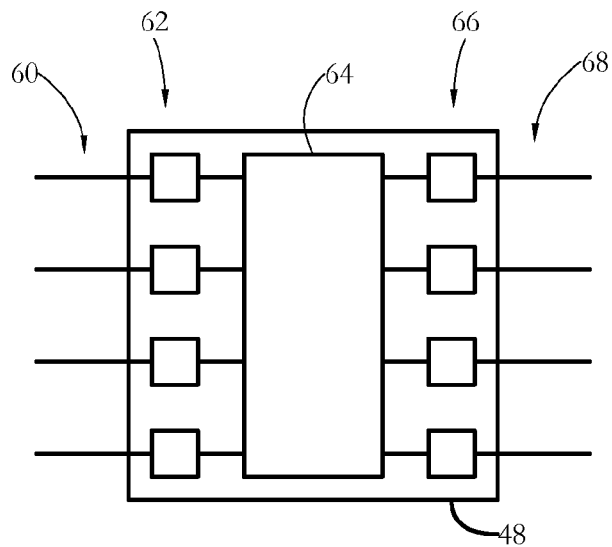
FIG. 2-B

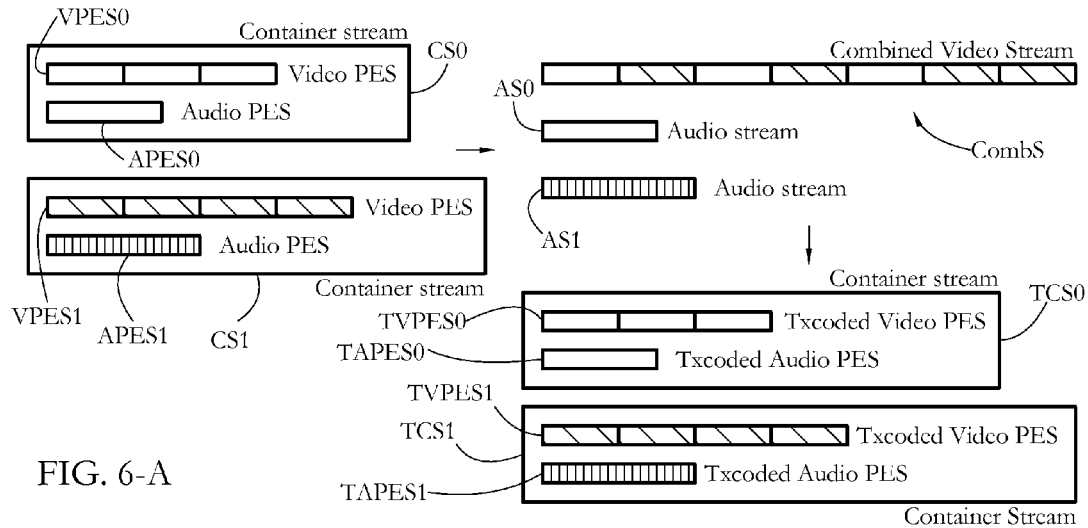
FIG. 6-A
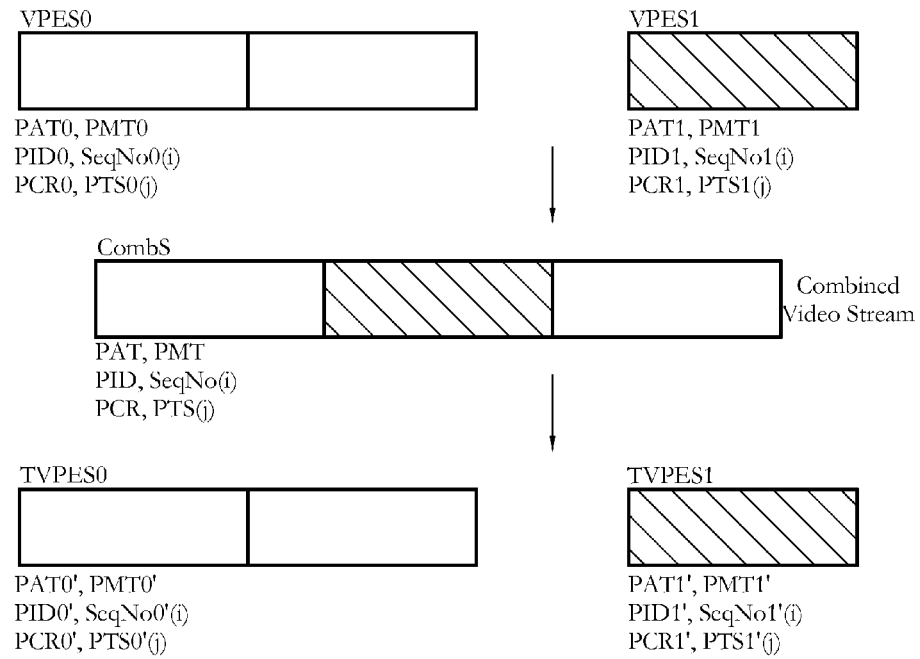
FIG. 6-B

VIDEO TRANSCODER STREAM MULTIPLEXING SYSTEMS AND METHODS

CROSS-REFERENCE TO RELATED APPLICATIONS

This application is a continuation of U.S. patent application Ser. No. 13/369,169, filed Feb. 8, 2012, first inventor Kizhepat, which is scheduled to issue as U.S. Pat. No. 8,325,821 on Dec. 4, 2012.

BACKGROUND

The invention relates to systems and methods for video encoding, and in particular to systems and methods for transcoding video and audio-video streams.

Video transcoding may be used to change various properties of a video stream, such as resolution and encoding format, among others. Transcoding is commonly a computationally-intensive process, which may involve decoding the input video stream from the compressed (transform) domain into the pixel domain and encoding the pixel-domain data into a new compressed-domain stream. Special-purpose hardware transcoders may be used to accelerate the transcoding process. Nevertheless, the performance of common software and/or hardware transcoding approaches may be limited, particularly for transcoding increasingly large numbers of streams in parallel.

SUMMARY

According to one aspect, a method comprises: assembling a syntactically-unified input video stream by interleaving groups of pictures (GOPs) from a plurality of independent input video streams into the syntactically-unified input video stream; transcoding the syntactically-unified input video stream to generate a syntactically-unified output video stream; and recovering a plurality of independent output video streams by de-interleaving GOPs from the syntactically-unified output video stream, and assembling the de-interleaved GOPs into the plurality of independent output video streams, each independent output video stream containing a transcoded content of a corresponding independent input video stream.

According to another aspect, a system comprises at least one processor configured to assemble a syntactically-unified input video stream by interleaving groups of pictures (GOPs) from a plurality of independent input video streams into the syntactically-unified input video stream; transcode the syntactically-unified input video stream to generate a syntactically-unified output video stream; and recover a plurality of independent output video streams by de-interleaving GOPs from the syntactically-unified output video stream, and assembling the de-interleaved GOPs into the plurality of independent output video streams, each independent output video stream containing a transcoded content of a corresponding independent input video stream.

According to another aspect, a system comprises: means for assembling a syntactically-unified input video stream by interleaving groups of pictures (GOPs) from a plurality of independent input video streams into the syntactically-unified input video stream; means for transcoding the syntactically-unified input video stream to generate a syntactically-unified output video stream; and means for recovering a plurality of independent output video streams by de-interleaving GOPs from the syntactically-unified output video stream, and assembling the de-interleaved GOPs into the plurality of independent output video streams, each independent output video stream containing a transcoded content of a corresponding independent input video stream.

BRIEF DESCRIPTION OF THE DRAWINGS

The foregoing aspects and advantages of the present invention will become better understood upon reading the following detailed description and upon reference to the drawings where:

FIG. 2-A illustrates an exemplary video transcoding server system hardware configuration according to some embodiments of the present invention.

FIG. 2-B illustrates an exemplary multi-port transcoder integrated circuit according to some embodiments of the present invention.

FIG. 6-A illustrates the processing of two exemplary audio-video container streams according to some embodiments of the present invention.

FIG. 6-B illustrates a number of header fields changed in an interleaving process according to some embodiment of the present invention.

DETAILED DESCRIPTION OF PREFERRED EMBODIMENTS

Figure 1:
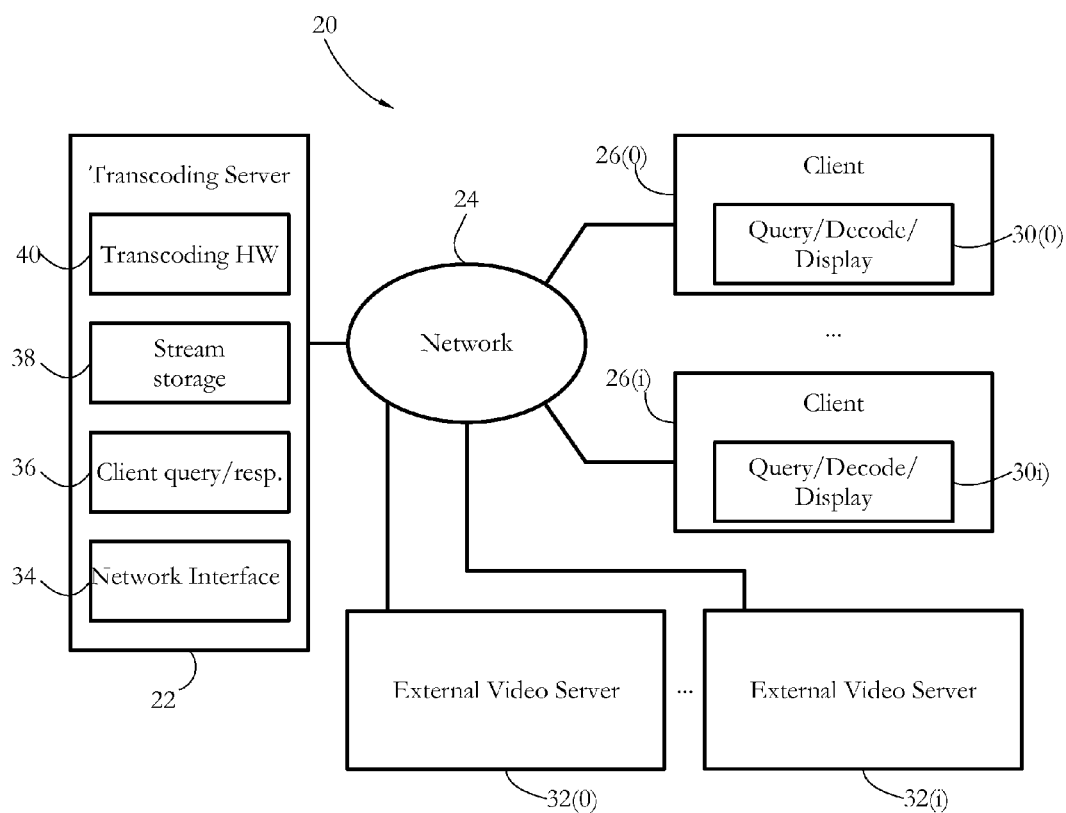
FIG. 1 illustrates an exemplary video transcoding and delivery computer system environment according to some embodiments of the present invention.

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "software program" encompasses both standalone programs and software routines that form part of larger programs. Making a determination or decision according to a parameter encompasses making the determination or decision according to the parameter and optionally according to other data. A group of pictures (GOP) is a sequence of pictures (group of successive pictures) including at least one I-frame. The term "syntactically-unified video stream" refers to a stream that is considered to be a single video stream by a transcoder under whatever format the transcoder receives as its input (e.g. a container stream or elementary stream), and does not encompass a concatenation of independent video streams. The term container stream is used below to refer to an audio-video container (wrapper) format capable of containing different elementary stream data types (e.g. audio and video). Examples of container stream formats include MPEG transport stream (MPEG-TS), MPEG Program Stream (MPEG-PS), QuickTime File Format, MP4, Flash Video (FLV), Audio-Video Interleave (AVI), 3GP, and RealMedia (RM). An elementary stream includes a single data type (video, audio, or caption). The terms "compressed domain" and "transform domain" refer to data that has undergone a transformation to the frequency domain, such as through application of a DCT, Hadamard or similar transform to pixel-domain data. Unless otherwise specified, an indicator of some quantity/data may be the quantity/data itself, or an indicator different from the quantity/data itself. Unless otherwise specified, the term "logic" encompasses both special-purpose hardware and one or more programmable microprocessors configured to execute software instructions. Computer readable media encompass storage (non-transitory) media such as magnetic, optic, and semiconductor media (e.g. hard drives, optical disks, flash memory, DRAM), as well as communications links such as conductive cables and fiber optic links. Provided herein are non-transitory computer-readable media encoding instructions which, when executed by a computer system, cause the computer system to perform the operations described below, as well as logic configured to perform the operations described below.

The following description illustrates embodiments of the invention by way of example and not necessarily by way of limitation.

Exemplary embodiments described illustrate systems and methods allowing efficiently scaling real-time transcoding processes to high numbers of video streams used in real-time transcoding applications. Input video streams are segmented in specific ways described below, the resulting video segments are interleaved into a combined stream (a "fat stream") seen by a standard-compliant transcoder syntactically as a single stream, and the resulting transcoded segments are de-interleaved from the combined transcoded output stream using timing and other in-stream information recorded for the interleaving breaks. Such a process allows the quasi-concurrent processing of higher numbers of video streams than the number of available transcoder ports, while also allowing making transcoding results available for the beginnings of such videos before the entire videos are fully transcoded, thus allowing a decrease in latency for real-time transcoding applications involving large numbers of videos.

FIG. 1 illustrates an exemplary video transcoding and delivery computer system environment 20 according to some embodiments of the present invention. A video server system 22 is connected to a plurality of client computer systems 26(i) and external video server systems 32(i) over a wide area network 24 (a network including at least one router) such as the Internet. In some embodiments network 24 may include a cable TV or satellite TV distribution network, or a local area network such as an enterprise or home network. Each client computer system 26(i) runs corresponding video search query, video decode and video display application(s) 30(i), which may be provided as part of a browser and/or as one or more standalone native applications. A video query application receives user input including a video search query or selection in text or other form (e.g. a user selection of an option). A video stream received in response to the video query is then decoded and displayed to the user using decode and video display application(s). External video servers 32(i) are configured to deliver requested individual videos to video server system 22, for preparation and storage in a local library of video server system 22.

Server system 22 includes a network interface subsystem 34, a client query and response subsystem 36, a stream storage subsystem 38, and a transcoding subsystem 40. In some embodiments, the various subsystems of server system 22 may be implemented by different hardware and/or physical servers. For example, one or more distinct physical servers may be used for each of client query and response subsystem 36, stream storage subsystem 38, and video transcoding subsystem 40. Moreover, in some embodiments, one or more distinct physical servers may be used to implement video transcoding subsystem 40.

Network interface subsystem 34 is used to communicate with client computer systems 30(i) and external video servers 32(i) over network 24. In particular, network interface subsystem 34 receives video queries and/or other user input from client computer systems 30(i), and in response sends to the requesting client computer systems 30(i) output video streams responsive to the received user input. In response to receiving a user video query and information on the client display hardware from a client computer system 30(i), server system 22 uses video query and response subsystem 36 to identify one or more video streams (videos) responsive to the query. Each video stream may be associated with a corresponding audio and/or data stream or data set. The client display hardware information is used identify a corresponding video library or sublibrary for that client hardware (e.g. laptop/desktop, netbook/tablet, or mobile phone library). The video query is used to identify one or more relevant streams within the library/ies according to text metadata associated with the streams.

Stream storage subsystem 38 is used to store one or more libraries of videos. In some embodiments, a single video resolution (or pixel density) is used across client display hardware configurations, and a single version is maintained by storage subsystem 38 for each video. In some embodiments, different resolutions are used for different client display hardware configurations. Separate versions of each video may then be maintained in corresponding libraries by storage subsystem 38, with each version having a resolution chosen according to the associated display hardware configuration.

Video transcoding subsystem 40 transcodes in real time videos received in various formats from external sources, for example from external video servers 32(i), and in response to a user query sends a transcoded video to the requesting client system 26(i) over network 24. Video transcoding subsystem 40 includes a pool of transcoder resources such as transcoder channels to which input streams can be allocated. Client 26(i) decodes and displays the transcoded video stream. In some embodiments, the transcoded video stream may be a spatially-composited video stream including an array of video panels as described in U.S. patent application Ser. No. 13/154,222, filed on Jun. 6, 2011, entitled "Scalable Real-Time Video Compositing System and Methods," which is herein incorporated by reference.

FIG. 2-A illustrates an exemplary hardware configuration for transcoding server 22 according to some embodiments of the present invention. In some embodiments, similar hardware configurations may be employed for each server subsystem illustrated in FIG. 1, with HI appropriate modifications (e.g. server subsystems not used for transcoding may not need to make use of special-purpose transcoding hardware). Server 22 may be a 1 U (one rack unit) server including one or more transcoder cards holding a number of special-purpose transcoder integrated circuits (chips), and a general-purpose processor configured to execute software as described below. Server 22 includes a plurality of components interconnected through a bus or buses 58: a general-purpose processor (CPU) 44, a plurality of multi-channel special-purpose transcoder integrated circuits 48 connected to bus/es 58 through a switch/bridge 46, an audio/video storage device 50, a memory 52, and a communications interface (e.g. network interface card) 54. Storage device 50 may include an array of hard disk drives. Switch/bridge 46 may be a PCI-Express (PCIe) switch, such as one available from PLX Technology, Inc. in Sunnyvale, Calif. Transcoder integrated circuits 48 may be commercially-available integrated circuits such as transcoders available from Magnum Semiconductor, Inc., Milpitas, Calif., Zenverge, Inc., Cupertino, Calif., or ViXS Systems, Toronto, Canada. In an exemplary configuration, server 22 may include two PCIe cards each having one PCIe switch 46 and fifteen transcoder integrated circuits 48, for a total of 30 hardware transcoder chips per 1 U server. Consider an exemplary transcoder in the 51xx series available from ViXS Systems. Such a transcoder is capable of simultaneous transcoding of up to 8 standard-definition (SD) streams between MPEG-2, H.264 and VC-1 formats, corresponding to about 2 high-definition (HD) streams, or about 8 or more conversions from SD to a lower preview resolution (e.g. 304×192). A system employing 30 such transcoder chips thus may be able to transcode concurrently in excess of 200 SD streams to SD or lower resolutions.

FIG. 2-B shows an exemplary four-channel (four-port) transcoder integrated circuit 48 according to some embodiments of the present invention. Each of four input ports 60 is connected to a corresponding output port 68 through a respective input buffer 62 and output buffer 66. A transcoding data processor 64 is commonly connected to input buffers 62 and output buffers 66. Transcoding data processor 64 includes data processing components for decoding input transform-domain data into the pixel domain, and re-encoding the pixel data domain into output transform-domain data with desired characteristics. Such data processing components may include components shared by multiple ports, for example by multithreading. Such components operate sequentially in different threads (contexts), each thread corresponding to a different transcoding channel (input/output port pair) and associated video stream.

Figure 3:
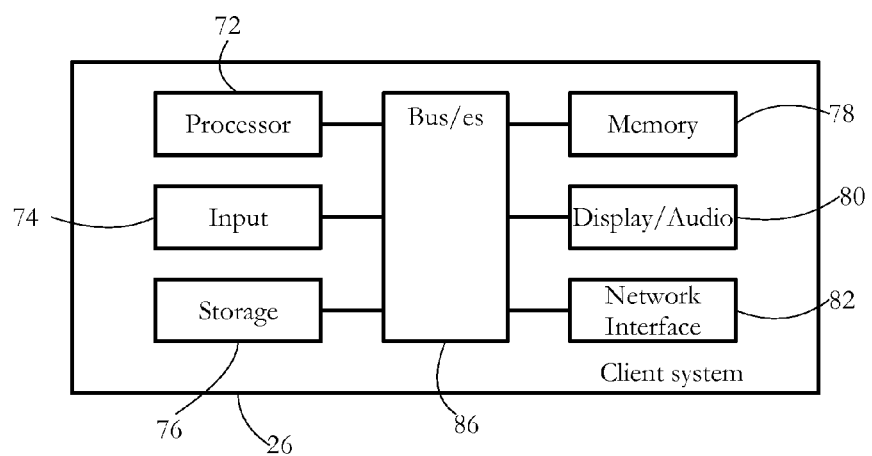
FIG. 3 illustrates an exemplary client system hardware configuration according to some embodiments of the present invention.

FIG. 3 illustrates an exemplary hardware configuration for a client system 26 according to some embodiments of the present invention. In some embodiments, client system 26 may be a personal computer such as a desktop or laptop computer, a mobile device such as a smartphone or tablet, or a television converter box. Client system 26 includes a general-purpose processor (CPU) 72, one or more user input devices 74 for receiving user input, a storage device 76, a memory 78, audio/video output device(s) 80 (e.g. display and speakers), and a communications interface (e.g. network interface card) 82, all interconnected through a bus or buses 86. Client system 26 is capable of generating a user display showing a transcoded output video as described below.

Figure 4:
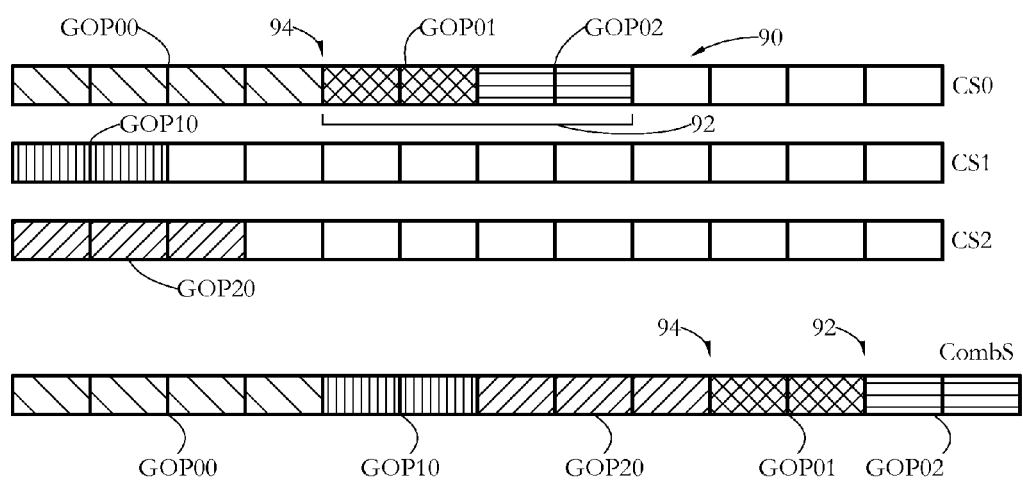
FIG. 4 shows an exemplary set of three independent input video streams and a corresponding combined stream generated by interleaving segments of the input video streams, according to some embodiments of the present invention.

FIG. 4 shows three exemplary independent input multimedia container (wrapper) streams CS0-2 and a corresponding combined, syntactically-unified input stream CombS generated by interleaving elementary stream or container stream segments of container streams CS0-2 according to some embodiments of the present invention. Examples of available formats for container streams CS0-2 include MPEG-2 Transport Stream (MPEG-TS), QuickTime File Format, MP4, Flash Video (FLV), Audio-Video Interleave (AVI), 3GP, and RealMedia (RM). Each container stream CS0-2 includes a sequence of container stream packets 90 and a corresponding sequence of groups-of-pictures (GOP). Exemplary GOPs are denoted in FIG. 4 by different hatching patterns.

Figure 5:
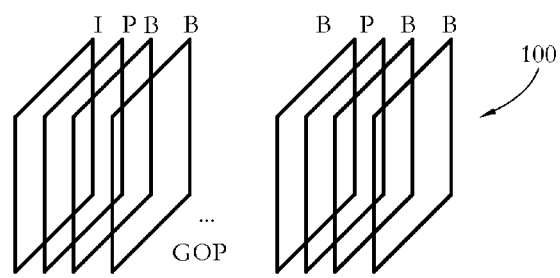
FIG. 5 shows an exemplary group of pictures (GOP) according to some embodiments of the present invention.

FIG. 5 shows an exemplary group-of-pictures (GOP) structure 100 of a video stream according to some embodiments of the present invention. All frame types are shown in display order. The first frame in the GOP is an I-(intra-) frame), while subsequent frames may be P-(predicted-) or B-(bi-directional-) frames. I-frames are encoded with reference only to data within the current frame (i.e. are self-contained). P-frames are encoded with reference to data from one or more preceding frames. B-frames can be encoded with reference to data from one or more preceding and one or more subsequent frames. As an example, a GOP may be a 16-frame sequence having the pattern IPBBPBBP-..PBB. Suitable GOPs may have other lengths and/or frame-type sequences. The exemplary GOP structure 100 is that of a closed GOP, i.e. one that references only data within that GOP. An open GOP may begin with one or more B frames that reference data (e.g. the last P frame) from a preceding GOP. In some embodiments, the start of a new GOP may be identified by detecting the start of an I-frame in a video data stream.

In FIG. 4, CS0 is shown to include a first GOP GOP00 immediately preceding a second GOP GOP01, which immediately precedes a third GOP GOP02. Each GOP may span multiple transport packets 90. Commonly, each GOP spans much higher numbers of transport packets 90 than illustrated in FIG. 4. Each container stream CS0-2 is divided into multiple segments 92 separated by interleaving (inter-segment) breaks 94. Each segment 92 includes one or more GOPs. All input streams CS0-2 share a common video encoding standard/format (e.g. MPEG-2, H.264/MPEG 4 Part 10) and may share a common resolution. In some embodiments, some input streams CS0-2 may have different resolutions than others.

In some embodiments, combined stream CombS may be a container stream (CS) or elementary stream (ES). Combined stream CombS includes a sequence of CS or ES segments 92 separated by interleaving breaks 94. In the sequence illustrated in FIG. 4, segments from transport streams TS0-2 are interleaved using a round-robin algorithm. Combined stream CombS is a syntactically-unified stream seen as a single standard-compliant stream by a transcoder. In embodiments in which combined stream CombS is a container stream, the combined stream is seen by a transcoder as a single container stream of the appropriate container stream format (e.g. MPEG-TS, MP4, FLV, etc.). In embodiments in which combined stream CombS is an elementary stream, the combined stream is seen by a transcoder as a single elementary stream of the appropriate elementary stream format (e.g. e.g. MPEG-2, H.264/MPEG 4 Part 10).

As shown in FIG. 4, interleaving breaks 94 coincide with container stream packet and inter-GOP breaks. As illustrated by the boundary between GOPs GOP01 and GOP02, some container stream packet and inter-GOP breaks need not coincide with an interleaving break. Each interleaving break 94 may be associated with multiple pieces of identifying information, including timing information (e.g. the value of a presentation time stamp, PTS in an associated header field), frame type information (e.g. the break precedes an I-frame), and/or GOP and frame counts separating the interleaving break from immediately preceding and/or subsequent interleaving breaks. Such information is stored upon interleaving, and used in a de-interleaving process described below in order to identify de-interleaving breaks corresponding to interleaving breaks 94.

In some embodiments, interleaving breaks 94 and the corresponding order of interleaving segments of combined stream CombS are chosen so as to balance the transcoding of different container streams CS0-2. In one simple approach to selecting interleaving breaks 94, a 1-GOP round-robin scheme is used to form combined stream CombS: an interleaving break 94 is defined after each GOP in a container stream CS0-2, and GOPs from different container streams are sequenced in combined stream CombS in a round-robin fashion (e.g. one GOP from CS0, followed by one GOP from CS1, followed by one GOP from CS2, followed by one subsequent GOP from CS0, and so on). In another approach, interleaving breaks 94 and the corresponding interleaving segment order are chosen according to the lengths of the interleaving segments and corresponding transcoding times to generally equalize the estimated transcoding time allotted to different streams, with the interleaving order chosen according to a round-robin scheme. Equalizing the estimated transcoding time may be achieved by counting the number of frames in each interleaving segment. For example, a 10-frame GOP from one stream may be followed by three 3-frame GOPs from a second stream. If the two streams have different resolutions, equalizing the estimated transcoding time may include defining interleaving segment lengths of different frame counts for the two streams.

In another approach, interleaving breaks 94 and the corresponding interleaving segment order are chosen according to a determination of a stream's priority or need for transcoded data, e.g. which stream's turn is coming up. Determining which stream's turn is coming up may be performed according to the presentation time stamps (PTS) for the streams, to advance the transcoding of all streams in a generally coordinated manner. For example, a stream's priority may be raised when its PTS indicates that its transcoding has fallen behind that of other streams with which it is interleaved in a common combined stream.

In yet another approach, interleaving breaks 94 and the corresponding interleaving segment order are chosen according to a determination of the need of a real or virtual client device buffer for transcoded data. Clients may send real-time real or virtual buffer fullness indicators to transcoding server 22, and streams corresponding to relatively empty buffers can receive higher transcoding priorities. For example, a paused stream may require relatively little transcoded data immediately, while a stream being fast-forwarded may require higher amounts of data when playback is resumed. A client's need for data may also be estimated by transcoding server 22 without client feedback data, by using a client playback rate and past data reception, both known at transcoding server 22, to estimate the client's need for new data at a given time. For example, an indicator of a client need for new data may increase with the product of the client playback rate and the time elapsed since the client has received transcoded data, and may decrease as transcoded data is provided to the client.

In some embodiments, video data from multiple audio-video streams is interleaved/multiplexed into a single transcoder video channel (input port) and transcoded as a single combined stream, while the corresponding audio data is transcoded continuously (uniplexed) from start to finish for each stream using one or more audio transcoder channels. Separating the audio and video transcoding may be particularly useful because transcoding the video part of a typical audio-video stream is commonly significantly more resource-intensive than transcoding the audio part. In addition, the audio and video stream breaks coinciding with a transport packet boundary need not correspond to each other.

FIG. 6-A illustrates the processing of two exemplary input audio-video container streams CS0, CS1 according to some embodiments of the present invention. Each container stream CS0, CS1 includes video and audio packetized elementary streams (PES) VPES0, APES0 and VPES1, APES1, respectively. The video and audio data in each container stream are shown separately for clarity of presentation, though video and audio PES packets may be interleaved in a common sequence forming each container stream. Commonly, one video PES packet corresponds to one picture (video frame), while one audio PES packet corresponds to one audio frame (audio presentation unit). In some embodiments, container stream packets have a fixed length, while PES packets have variable lengths which may be much longer than one container stream packet. For example, for MPEG-TS container stream packets, each packet may contain 188 bytes of data, while each PES packet may include higher number of bytes. A PES packet thus may span multiple CS packets. Also, in general, one audio PES packet may contain audio data corresponding to more than one video frame or GOP.

Prior to transcoding, the video data from container streams CS0, CS1 is interleaved to create a multiplexed combined video stream CombS, shown in FIG. 6-A. Data received by the transcoder includes the combined video stream CombS and separate audio streams AS0, AS1. Audio streams AS0, AS1 may be packetized elementary streams identical to streams APES0, APES1, respectively, or other types of elementary streams containing the audio data of streams APES0, APES1. The transcoded video data generated by transcoding combined video stream CS0 are de-interleaved and packetized to generate transcoded output video packetized elementary streams TVPES0, TYPES1, which are assembled together with corresponding transcoded audio packetized audio elementary streams TAPES0, TAPES1 into output container streams TCS0, TCS1, respectively.

FIG. 6-B illustrates a number of header fields which are changed in order to generate combined video stream CombS according to some embodiments of the present invention. Modified header fields such as the ones listed in FIG. 6-B may be container stream and/or elementary stream header fields, as described below. Each video streams VPES0, VPES1 is associated with stream-specific container and/or PES header field values for header fields such as a program association table (PAT), program map table (PMT), packet ID (PID), sequence numbers (Seq. No.), program clock reference (PCR) and presentation time stamps (PTS), among others. Fields corresponding to video stream VPES0 are denoted using the suffix 0 (e.g. PAT0), while fields corresponding to video stream VPES1 are denoted using the suffix 1 (e.g. PAT1) in FIG. 6-B. The indexes i and j denote the presence of multiple values for the sequence number and presentation time stamp fields for a corresponding PES packet or interleaving segment.

The values of fields illustrated in FIG. 6-B are modified to common unified-stream values, shown in FIG. 6-B without a suffix (e.g. PAT), as described below. The common values are associated with the payload video data of combined stream CombS to yield a syntactically-unified video stream which is treated as a single video stream by a standard-compliant transcoder/decoder. The combined stream CombS includes the video payload data of individual streams VPES0, VPES1, such as transform coefficients/residuals, in unmodified form. After transcoding, suitable post-transcoding values for the illustrated fields are generated for each independent transcoded output video stream TVPES0, TYPES1. Fields associated with output video stream TVPES0 are denoted by the suffix 0' (e.g. PAT0') while fields associated with output video stream TVPES1 are denoted by the suffix 1' (e.g. PAT1') in FIG. 6-B.

Appropriate modifications performed to various header fields in order to generate a syntactically-unified video stream from multiple independent video streams may be better understood by considering exemplary container stream and elementary stream header formats/fields according to some embodiments of the present invention.

Figure 7:
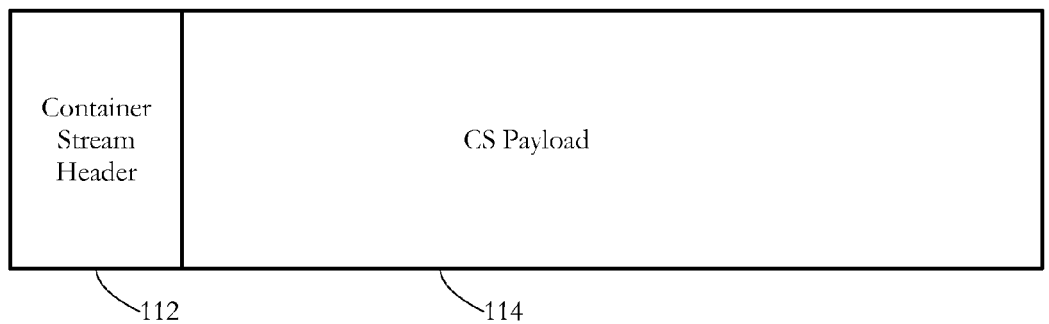
FIG. 7 shows an exemplary container stream packet according to some embodiments of the present invention.

FIG. 7 shows an exemplary container stream (CS) packet 110 according to some embodiments of the present invention. CS packet 110 includes a CS header 112 and an associated CS payload 114. CS payload 114 may includes various parts (fields) of an elementary stream (ES) such as a video, audio or data stream, as well as metadata such as program-specific information (PSI). In some embodiments, potential types of PSI include: program association table (PAT), program map table (PMT), conditional access table (CAT), and network information table (NIT).

Figure 8:
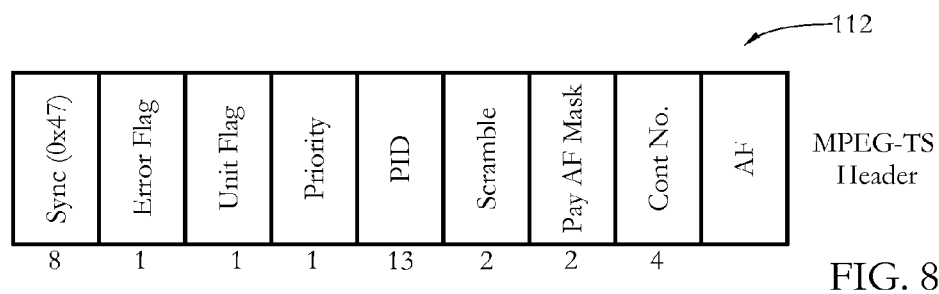
FIG. 8 illustrates a number of exemplary container stream header fields according to some embodiments of the present invention.

FIG. 8 illustrates a number of fields of an exemplary CS header 112 according to some embodiments of the present invention. Field descriptions are shown within the boxes of FIG. 8, while an exemplary numbers of bits used for each associated field is shown below each box of FIG. 8. For clarity of presentation, the following discussion focuses on an MPEG-TS stream as an example. An MPEG-TS stream encapsulates one or more packetized elementary streams (PES), each of which carries a corresponding elementary stream (ES). CS header 112 includes a one-byte Sync field having a fixed value of 0x47, used to synchronize data transmission by indicating the start of the associated header. A one-bit Error Flag field is used to indicate the presence or absence of uncorrectable error(s). A one-bit Unit Flag (or payload unit start indicator) field is used to indicate the start of packetized elementary stream (PES) or program-specific information (PSI) data; a flag value of 1 indicates the start of PES or PSI data, while the flag value is zero otherwise. A one-bit Transport Priority flag is used to indicate a higher priority than other packets with the same PID. A 13-bit PID field indicates a PID value mapped by a corresponding PMT. A two-bit Scrambling Control (Scramble) field indicates whether the associated data is scrambled, and if yes a type of scrambling key (e.g. even/odd). A two-bit Payload Adaptation Field (AF) Mask (or Adaptation Field Existence) field indicates the existence of a payload only (no adaptation field), adaptation field only (no payload), or both a payload and adaptation field. A four-bit Continuity Counter (sequence number) field is incremented only when a payload is present, as indicated by the Payload AF Mask field. The sequence number is an indicator of packet payload order. A 4-bit (0-15) counter increases sequentially for consecutive container packets carrying a payload (e.g. 0, 1, 2 . . . 15, 0, 1 . . . ). An Adaptation field (AF), if present, has a number of bits which depends on the value(s) of associated flags.

The adaptation field may include header fields such as a program clock reference (PCR) flag indicating whether the adaptation field includes a PCR field, a PCR field used as a time reference at the decoder to generate a system timing clock value for audio-video synchronization, a splicing point flag indicating the presence of a splice countdown field in the adaptation field, and a splice countdown field indicating a positive or negative distance in CS packets from the current packet to a splicing point. A PCR value is used as a time base reference for presentation time stamps (PTS). Presentation time stamps denote when, relative to the PCR, a corresponding video or audio frame is to be presented to the user. PTS values are used to synchronize corresponding audio and video streams at the decoder. A splicing point separates two packets of a particular elementary (PID) stream, providing a CS packet boundary for splicing. A splicing point, which may be useful for video editing, may coincide with a stream interleaving break as described above, but generally interleaving breaks as described above need not be associated with such splicing points or splice countdown fields.

Figure 9:
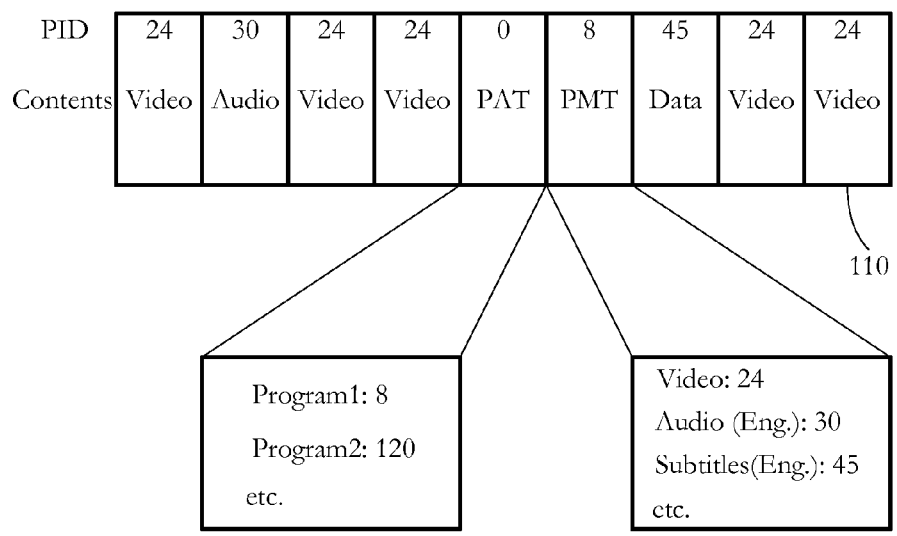
FIG. 9 shows an exemplary sequence of container stream packets having different PIDs according to some embodiments of the present invention.

FIG. 9 shows an exemplary sequence of container stream packets 110 having different PIDs according to some embodiments of the present invention. The PID of each CS packet 110 is shown at the top of the corresponding box in FIG. 9, while a description of the packet contents is shown in the center of each box, and exemplary PAT and PMT packet contents are shown in separate boxes below the main sequence. As shown in FIG. 9, video packets of a given program are identified by an exemplary PID of 24, while corresponding audio and program/text data (e.g. closed captioning or subtitle data) packets are identified by exemplary PIDs of 30 and 45, respectively. A standard PID of zero identifies a program association table (PAT), which lists the PIDs of program map tables (PMT) corresponding to different independent multimedia streams (programs). The exemplary PAT shown in FIG. 9 indicates that the PMT for a first program (Program1) is associated with a PID of 8, while the PMT for a second program (Program2) is associated with a PID of 120. The PMT packet for the first program, shown in FIG. 9 under the PID value of 8, lists the PID values for the video, audio, and text components of the first program (exemplary PID values of 24, 30, and 45, respectively). Within each elementary stream (e.g. the video elementary stream characterized by PID 24), some CS packets may carry PES packet header and/or payload data, for example as indicated by the Payload AF field described above with reference to FIG. 8.

To understand the modifications to various header fields performed to generate a syntactically-unified combined video stream as described above, consider a combined video stream such as the stream CombS shown in FIG. 6-B, generated by interleaving segments of independent input video streams VPES0, VPES1. A common PAT for the unified stream CombS identifies a single PID for the PMT of the CombS program. The PMT PID may be chosen to be a PID not used by any of the streams to be interleaved (VPES0, VPES1 in the example illustrated in FIG. 6-B). For example, if PAT0 for VPES0 identifies a PID of 8 for the PMT of VPES0, and PAT1 for VPES1 identifies a PID of 23 for the PMT of VPES1, a common PID of 100 may be chosen for the PMT of CombS. The PID for the CombS PMT may also be chosen to be the PID for the PMT of one of the input streams, for example the first input video stream VPES0.

A common PID for the video packets of stream CombS is then chosen. The common PID may be chosen to be an available PID not used by any of the streams to be interleaved, or may chosen to be the video packet PID of one of the interleaved videos, for example the first input video stream VPES0. A PMT for stream CombS is generated and associated with the chosen PMT PID. The PTM for stream CombS identifies the PID selected for the video packets of stream CombS. The PIDs for the video packets to be interleaved into stream CombS are updated from the individual stream PIDs for streams VPES0, VPES1 to the common PID selected for the video packets of stream CombS.

In some embodiments, sequence number conformity with decoder expectations may be preserved by updating the sequence number associated with each video packet to be interleaved into stream CombS, by setting a discontinuity indicator (flag) in an adaptation field, and/or by inserting partly-padded, quasi-dummy CS packets at interleaving interfaces to yield a common sequence for stream CombS. For example, if a sequence of CS packets with sequence numbers (0, 1, 2, 3) from stream VPES1 is inserted between two sequences of CS packets of stream VPES0 with sequence numbers (0, 1, 2, 3) and (4, 5, 6, 7), respectively, the sequence numbers of the VPES1 packets and the second sequence of VPES0 packets may be changed to (4, 5, 6, 7) and (8, 9, 10, 11), respectively, to yield a sequence of (0, 1, . . . , 10, 11) for the combined stream. As a skilled artisan would appreciate, 4-packet sequences were used above for clarity of presentation; CS sequences corresponding to a GOP may generally include much larger numbers of CS packets. In another approach, the adaptation field discontinuity indicator in the first interleaved packet from VPES1 is set to a discontinuity value (e.g. 1). Setting the discontinuity indicator to 1 indicates a discontinuity state in the continuity counter and/or program clock reference. In yet another approach, a sufficient number of partly-padded, quasi-dummy packets are inserted at the interface of the interleaving segments to maintain sequence number continuity, for example by splitting off data from the last (pre-interleaving) VPES0 CS packet or from the first (post-interleaving) VPES1 CS packet into multiple padded CS packets. For example, to insert 3 dummy packets at the interleaving interface, an 188-byte payload of the last pre-interleaving CS packet is replaced by the first 185 bytes of the payload (supplemented with 3 bytes of padding), and the remaining three bytes are distributed to form three subsequent CS packets. Each subsequent CS packet includes one byte from the original payload and 187 bytes of padding.

In some embodiments, if the PCR and/or PTS values associated with the interleaved packets do not affect the transcoding process, the original PCR and PTS values associated with the VPES0 and VPES1 streams may be maintained for combined stream CombS. In some embodiments, the PCR and/or PTS values associated with the video packets of streams VPES0, VPES1 are updated to yield a common PCR for stream CombS, and a sequence of PTS values that reflects the order of the packets within stream CombS. For example, if a 10-second sequence with PTS values corresponding to 0-10 seconds from stream VPES1 is inserted between two 5-second sequences of CS packets of stream VPES0 with PTS values corresponding to 0-5 seconds and 5-10 seconds, respectively, the PTS values for the VPES1 packets and the second sequence of VPES0 packets are changed to values corresponding to 5-15 seconds and 15-20 seconds relative to the common PCR of stream CombS.

In some embodiments, a stream encoded according to the H.264/MPEG-4 Part 10 Network Abstraction Layer (NAL) may use different header fields and stream syntax than the exemplary fields/syntax illustrated above. Coded video data may be organized in packets denoted as NAL units, which include a header specifying a type of associated payload, and the associated payload. NAL units are associated with sequence parameter sets (SPS), which apply to a sequence of video pictures (a set of consecutive pictures), and picture parameter sets (PPS), which apply to one or more video pictures. Each NAL unit includes an identifier of a corresponding picture parameter set, and each picture parameter set includes an identifier of a corresponding sequence parameter set. Examples of sequence parameters include limits on frame numbers and picture order count, decoded picture size (height and width), and number of reference frames that may be used in decoding. Examples of picture parameters include an identifies of a corresponding SPS, a number of slice groups in use, an identifier of VLC or CABAC entropy coding, the numbers of reference frames in list 0 and list 1 that may be used for prediction, and initial quantizer parameters. Interleaving cutting points for H.264 streams may be chosen to coincide with concurrent SPS and PPS transitions.

Figure 10:
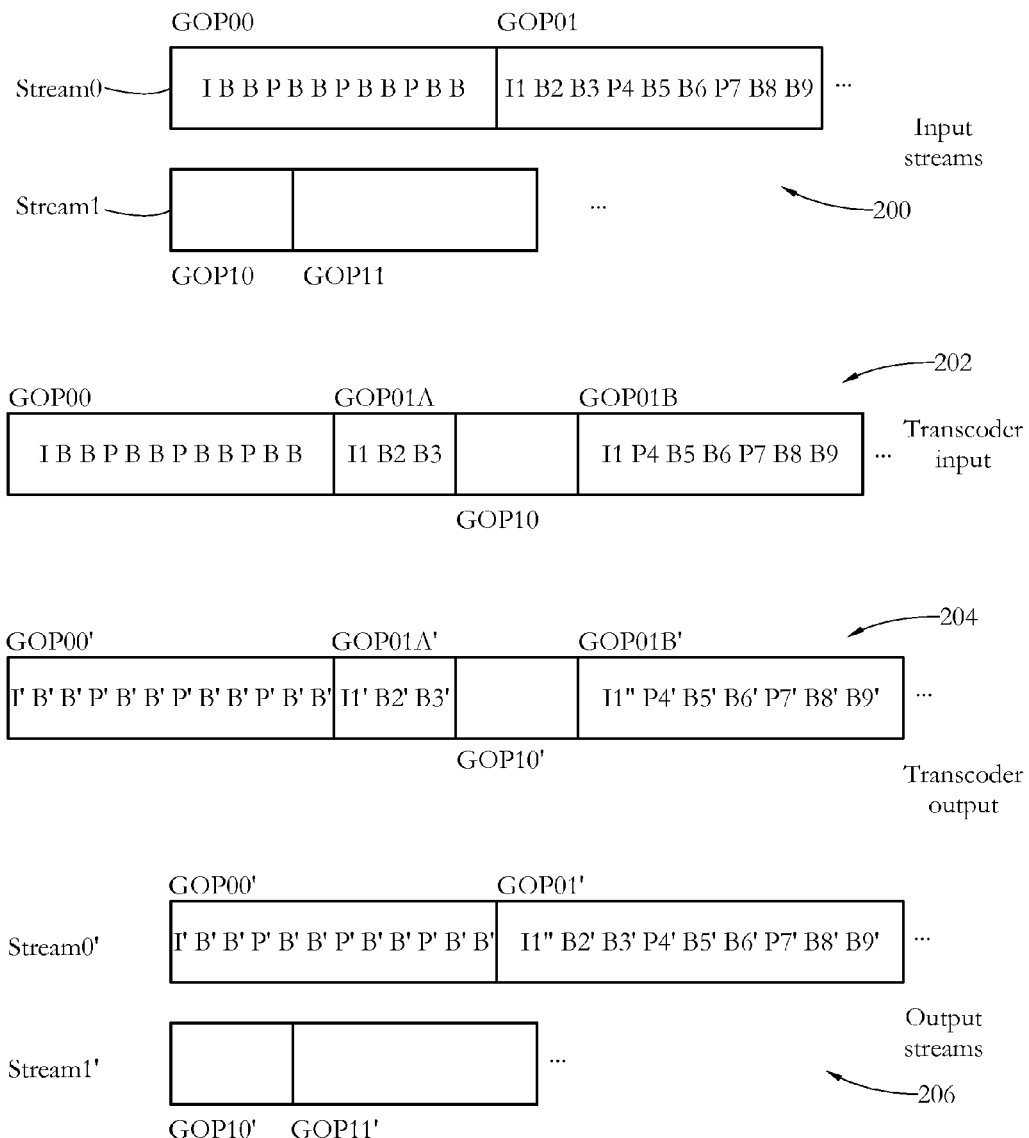
FIG. 10 illustrates interleaving for an open-GOP stream according to some embodiments of the present invention.

FIG. 10 illustrates interleaving for an open-GOP input video stream according to some embodiments of the present invention. A set of input streams 200 are interleaved into a combined input stream 202 which is input to a transcoder channel to generate a transcoded combined output video stream 204. The components of combined output stream 204 are de-interleaved to generate a set of independent output video streams 206, each being a transcoded version of a corresponding input video stream. In particular, a first input stream Stream0 has an open GOP structure, so some of the frames in a given GOP may reference frames in an immediately previous GOP. First input stream Stream0 is interleaved with a second input stream Stream1, which may have an open or closed GOP structure.

The open GOP structure of first stream Stream0 will be better understood by considering two exemplary consecutive GOPs GOP00 and GOP01. Two B-frames at the beginning of GOP GOP01 (frames B2, B3 in FIG. 10) reference one or more frames (e.g. I and/or P frames) from the preceding GOP GOP00. Decoding frames B2 and B3 thus uses data from GOP GOP00, and GOP GOP01 is not decodable independently. This inter-GOP dependency poses special challenges to interleaving segments of other video streams (e.g. GOPs GOP10 and/or GOP11 of second stream Stream1) between GOPs GOP00, GOP01.

In some embodiments, to generate interleaved transcoder input stream 202, an additional GOP or GOP extension GOP01A is added immediately after GOP GOP00 and before any interleaved segments from other streams (before the GOP GOP10 shown in FIG. 10). The added GOP GOP01A includes the first I-frame I1 of GOP GOP01 and the frames B2, B3 from GOP GOP01 that reference frames from GOP GOP00. A remainder GOP GOP01B is generated by removing the frames B2, B3 from GOP GOP01, and the remainder GOP GOP01 is interleaved after the external GOP GOP10 to generate transcoder input stream 202. The I-frame I1, which is referenced by other frames of GOP GOP01, is retained in remainder GOP GOP01B.

Transcoder input stream 202 is transcoded using a single transcoder channel to generate combined transcoder output stream 204. Two independent output video streams Stream0', Stream1' are recovered by de-interleaving data from combined transcoder output stream 204 and performing a number of modifications to the transcoded data of open-GOP stream Stream0 as described below. The transcoded additional GOP or GOP extension GOP01A' immediately following transcoded GOP GOP00' is removed, and the transcoded frames B2', B3' are inserted between the transcoded frames I1" and P4' of transcoded remainder GOP GOP01B' to generate a transcoded output GOP GOP01'. In some embodiments, transcoded frame I1 from GOP GOP01A' may be used in GOP GOP01' instead of transcoded frame I1" from GOP GOP01B'. Using transcoded frame I1" may be preferable if there are any differences between frames I1' and I1", since transcoded frame I1" served as a reference for the larger number of frames in GOP GOP01B'.

After de-interleaving, output stream Stream0' includes consecutive GOPs GOP00', GOP01' corresponding to input GOPs GOP00 and GOP01, respectively, while output stream Stream1' includes consecutive GOPs GOP10', GOP11' corresponding to input GOPs GOP10, GOP11', respectively.

Figure 11:
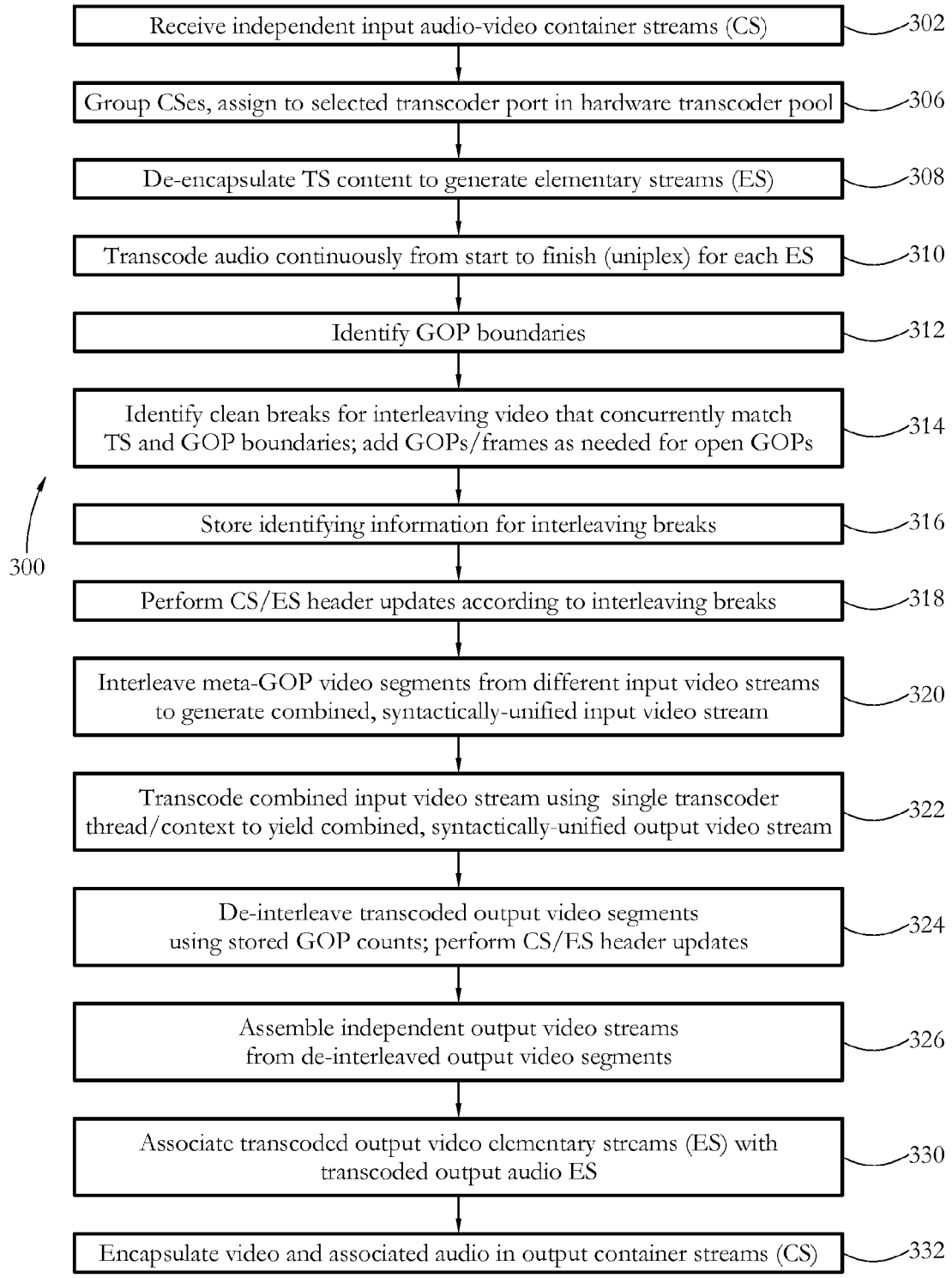
FIG. 11 shows a sequence of steps performed by a time-multiplexed audio-video transcoding system according to some embodiments of the present invention.

FIG. 11 shows a sequence of steps 300 performed by a time-multiplexed audio-video transcoding system/method according to some embodiments of the present invention. In some embodiments, a transcoding step 322 is performed by a special-purpose hardware transcoder 48, while the other steps illustrated in FIG. 10 are performed by one or more programmable general-purpose processors 44 (see FIG. 2-A) As shown in FIG. 10, in a step 302, a plurality of independent input audio-video container streams (CS) are received over network interface 54, storage 50, and/or memory 52. The independent container streams encode separate, independently decodable audio-video programs, for example different movies or the contents of different television channels.

In a step 306, subsets of the received CSes are grouped and assigned to a selected transcoder input port in a pool of transcoder resources such as a pool of multi-port special-purpose hardware transcoders. A load-balancing algorithm for assigning CSes to transcoder channels may employ a round-robin scheme, and/or stream priority data indicating which stream's transcoding time has come, in a manner similar to the ones described above for choosing interleaving breaks and interleaving segment orders. In some embodiments, some transcoder channels are dedicated to specific ES standard—for example, some channels may be dedicated to MPEG-2 input streams, while others may be dedicated to H.264 input streams. In some embodiments, a number of transcoder channels may be reserved for handling high-priority parts of input streams, such as the beginnings of independent input video streams. Achieving low-latency transcoding may be particularly desirable at the beginning of video streams, to facilitate faster initiation of playback for requesting clients.

In a step 308, the content of each CS packet is de-encapsulated to generate elementary stream (ES) audio/video/data content. In a step 310, each audio elementary stream is transcoded continuously from start to finish. Inter-GOP boundaries in each ES content sequence are identified in a step 312. The start of a new GOP may be identified by detecting the beginning of an I-frame according to one or more corresponding elementary stream field. For MPEG-2, such fields may be a 4-byte sequence header and a 4-byte start code identifying a GOP header. A GOP header identifies the beginning of a GOP. For H.264, a NAL Instantaneous Decoder Refresh (IDR) access unit at the beginning of a video sequence contains an I-frame and may be used as an indicator of the start of a GOP. In some embodiments, at least part of step 312 may include analyzing container stream (CS) data, and may be performed prior to step 308 described above.

In a step 314, a set of segment interleaving breaks (clean cuts) are identified as described above. In some embodiments, at least part of step 314 may include analyzing container stream (CS) data, and may be performed before step 308 described above. The identified segment interleaving breaks coincide with CS packet and inter-GOP boundaries. For open GOPs, additional frames/GOPs may be added to some interleaving segments as described above with reference to FIG. 10.

In a step 316, identifying information for the segment interleaving breaks is stored for use in subsequent de-interleaving of transcoded segments. Such identifying information may include GOP and frame counts for each interleaving segments, and/or timing information such as a presentation time stamp (PTS) corresponding to each interleaving segment. The counts may be stored as an ordered list of frame count values for each component GOP of a segment.

In a step 318, ES and/or CS header updates are performed as described above according to the identified interleaving breaks, so as to yield a syntactically-unified stream upon interleaving. In a step 320, video segments from different input video streams are interleaved, as described above to generate a combined, syntactically-unified input video stream. In some embodiments, the interleaved video is re-encapsulated into a container stream before being input to a transcoder, for example in order to include container stream timing information and/or if the transcoder is particularly suited to transcoding container stream data. The updated ES and/or CS header fields generated in step 318 are included in the combined video stream.

The combined video stream is input to a single transcoder port and transcoded in a single transcoder processor thread (context) to generate a combined, syntactically-unified output video stream (step 322). The transcoding may involve changes in bitrate, scaling, slice structure/assignment, elementary stream format/standard, frame rate, and/or other video characteristics.

In a step 324, transcoded output video segments are de-interleaved from the combined output video stream using the stored identifiers of interleaving breaks and/or other CS and/or ES header field information, and ES and/or CS header updates are performed according to the de-interleaving breaks and stored header field data. Identifying a de-interleaving break may include a comparison of GOP count data extracted from the output video stream to stored GOP count data identifying segment interleaving breaks. In some embodiments, the timing information (e.g. PTS values) generated by the transcoder is discarded and replaced with stored timing information which reflect the true relative temporal structure of de-interleaved segments.

In a step 326, a plurality of independent output video streams are assembled from the de-interleaved output video segments. Each independent output video stream is a transcoded version of a corresponding independent input video stream. In a step 330, each transcoded output video stream is associated with a corresponding transcoded output audio stream (if any), and the audio, video, and associated data are encapsulated to generate an output CS in a step 332. As described above, in some embodiments a re-encapsulation step may be performed prior to the transcoder input.

The exemplary video multiplexing and transcoding systems and methods described above allow low-latency, scalable video transcoding for large number of independent video streams using a lower number of transcoder channels. A set of interleaving metadata, which can be thought of as interleaving stream states or contexts, are maintained outside the transcoder, and are used to assemble and disassemble a combined video stream which is seen by a transcoder channel as a single standard-compliant stream to be transcoded in a single processing thread of the transcoder. Such methods are particularly useful for applications that involve transcoding large numbers of videos with low latency. One such application may include on-demand transcoding of multiple query-dependent video panels identified in response to user queries, in order to facilitate assembly of such panels into a common composite panel encoded as a single stream.

It will be clear to one skilled in the art that the above embodiments may be altered in many ways without departing from the scope of the invention. Accordingly, the scope of the invention should be determined by the following claims and their legal equivalents.

What is claimed is:

1. A method comprising:
  employing software running on at least one programmable processor to assemble a syntactically-unified input video stream by interleaving groups of pictures (GOPs) from a plurality of independent input video streams into the syntactically-unified input video stream;
  employing a special-purpose hardware transcoder connected to the at least one programmable processor to transcode the syntactically-unified input video stream to generate a syntactically-unified output video stream;
  employing software running on the at least one programmable processor to recover a plurality of independent output video streams by de-interleaving GOPs from the syntactically-unified output video stream, and assembling the de-interleaved GOPs into the plurality of independent output video streams, each independent output video stream containing a transcoded content of a corresponding independent input video stream.

2. The method of claim 1, wherein the plurality of independent input video streams include corresponding plural packet ID (PID) header field values each associated with a different independent input video stream, and wherein the syntactically-unified input video stream includes a common packet ID (PID) header field value characterizing payloads from plural independent input video streams.

3. The method of claim 1, wherein the plurality of independent input video streams include corresponding plural sequences of sequence number (Seq. No.) header field values, each sequence associated with a different independent input video stream, and wherein the syntactically-unified input video stream includes a common sequence of sequence number (Seq. No.) header field values characterizing payloads from plural independent input video streams.

4. The method of claim 1, wherein the plurality of independent input video streams include corresponding plural header field values, each associated with a different independent input video stream, for a header parameter selected from a group consisting of a program association table (PAT) and program map table (PMT), and wherein the syntactically-unified input video stream includes a common header field value for the header parameter, the common header field value characterizing payloads from plural independent input video streams.

5. The method of claim 1, wherein the plurality of independent input video streams include corresponding plural program clock reference (PCR) header field values each associated with a different independent input video stream, and wherein the syntactically-unified input video stream includes a program clock reference (PCR) header field value characterizing payloads from plural independent input video streams.

6. The method of claim 1, further comprising analyzing a structure of each input video stream to identify a set of intra-stream interleaving cutting points that meet a set of interleaving suitability conditions, wherein a tentative interleaving cutting point meets the set of interleaving suitability conditions if the tentative interleaving cutting point matches a group-of-pictures boundary.

7. The method of claim 6, further comprising:
  storing input video stream header information corresponding to each identified intra-stream interleaving cutting point;
  identifying header information in the combined output video stream that matches the stored input video stream header information; and
  identifying a set of intra-stream de-interleaving cutting points according to the identified header information in the combined output video stream.

8. The method of claim 7, wherein the input video stream header information corresponding to each identified intra-stream interleaving cutting point comprises a presentation time stamp (PTS).

9. The method of claim 1, further comprising:
  storing a set of frame counts for each interleaved input video stream segment; and
  identifying a set of intra-stream de-interleaving cutting points in the syntactically-unified output video stream according to the stored set of frame counts.

10. The method of claim 1, further comprising:
  for each independent input video stream, identifying a continuous input audio stream associated with and spanning the independent input video stream,
  transcoding the continuous input audio stream continuously to generate a continuous output audio stream, and
  associating the continuous output audio stream with a corresponding recovered independent output video stream in an output container stream.

11. The method of claim 1, comprising employing software running on the at least one programmable processor to transcode a plurality of input audio streams associated with the plurality of plurality of independent input video streams.

12. The method of claim 1, further comprising:
  identifying a set of input frames of a second GOP of an independent video stream having an open GOP structure, the identified set of input frames referencing at least one frame of a first GOP of the independent video stream, the second GOP being immediately subsequent temporally to the first GOP;
  assembling an additional GOP comprising an intra-frame of the second GOP and the identified set of input frames of the second GOP;
  inserting the additional GOP between the first GOP and the second GOP, and removing the identified set of input frames from the second GOP for assembly into the syntactically-unified input video stream.

13. A system comprising:
  a special-purpose hardware transcoder configured to transcode a syntactically-unified input video stream to generate a syntactically-unified output video stream;
  at least one programmable processor connected to the special-purpose hardware transcoder, and configured to execute software instructions to assemble the syntactically-unified input video stream by interleaving groups of pictures (GOPs) from a plurality of independent input video streams into the syntactically-unified input video stream; and recover a plurality of independent output video streams by de-interleaving GOPs from the syntactically-unified output video stream, and assembling the de-interleaved GOPs into the plurality of independent output video streams, each independent output video stream containing a transcoded content of a corresponding independent input video stream.

14. The system of claim 13, wherein the plurality of independent input video streams include corresponding plural packet ID (PID) header field values each associated with a different independent input video stream, and wherein the syntactically-unified input video stream includes a common packet ID (PID) header field value characterizing payloads from plural independent input video streams.

15. The system of claim 13, wherein the plurality of independent input video streams include corresponding plural sequences of sequence number (Seq. No.) header field values, each sequence associated with a different independent input video stream, and wherein the syntactically-unified input video stream includes a common sequence of sequence number (Seq. No.) header field values characterizing payloads from plural independent input video streams.

16. The system of claim 13, wherein the plurality of independent input video streams include corresponding plural header field values, each associated with a different independent input video stream, for a header parameter selected from a group consisting of a program association table (PAT) and program map table (PMT), and wherein the syntactically-unified input video stream includes a common header field value for the header parameter, the common header field value characterizing payloads from plural independent input video streams.

17. The system of claim 13, wherein the plurality of independent input video streams include corresponding plural program clock reference (PCR) header field values each associated with a different independent input video stream, and wherein the syntactically-unified input video stream includes a program clock reference (PCR) header field value characterizing payloads from plural independent input video streams.

18. The system of claim 13, wherein the at least one processor is further configured to analyze a structure of each input video stream to identify a set of intra-stream interleaving cutting points that meet a set of interleaving suitability conditions, wherein a tentative interleaving cutting point meets the set of interleaving suitability conditions if the tentative interleaving cutting point matches a group-of-pictures boundary.

19. The system of claim 18, wherein the at least one processor is further configured to:
store input video stream header information corresponding to each identified intra-stream interleaving cutting point;
identify header information in the combined output video stream that matches the stored input video stream header information; and
identify a set of intra-stream de-interleaving cutting points according to the identified header information in the combined output video stream.

20. The system of claim 19, wherein the input video stream header information corresponding to each identified intra-stream interleaving cutting point comprises a presentation time stamp (PTS).

21. The system of claim 13, wherein the at least one processor is further configured to:
store a set of frame counts for each interleaved input video stream segment; and
identify a set of intra-stream de-interleaving cutting points in the syntactically-unified output video stream according to the stored set of frame counts.

22. The system of claim 13, wherein the at least one processor is further configured to:
for each independent input video stream, identify a continuous input audio stream associated with and spanning the independent input video stream,
transcode the continuous input audio stream continuously to generate a continuous output audio stream, and
associate the continuous output audio stream with a corresponding recovered independent output video stream in an output container stream.

23. The system of claim 13, wherein the at least one programmable processor is configured to execute software instructions to transcode a plurality of input audio streams associated with the plurality of plurality of independent input video streams.

24. The system of claim 13, wherein the at least one processor is further configured to:
identify a set of input frames of a second GOP of an independent video stream having an open GOP structure, the identified set of input frames referencing at least one frame of a first GOP of the independent video stream, the second GOP being immediately subsequent temporally to the first GOP;
assemble an additional GOP comprising an intra-frame of the second GOP and the identified set of input frames of the second GOP; and
insert the additional GOP between the first GOP and the second GOP, and remove the identified set of input frames from the second GOP for assembly into the syntactically-unified input video stream.

25. A system comprising:
programmable processor means programmed with software for assembling a syntactically-unified input video stream by interleaving groups of pictures (GOPs) from a plurality of independent input video streams into the syntactically-unified input video stream;
special-purpose hardware transcoder means for transcoding the syntactically-unified input video stream to generate a syntactically-unified output video stream; and
programmable processor means programmed with software for recovering a plurality of independent output video streams by de-interleaving GOPs from the syntactically-unified output video stream, and assembling the de-interleaved GOPs into the plurality of independent output video streams, each independent output video stream containing a transcoded content of a corresponding independent input video stream.

* * * * *